United States Patent
Cole

(10) Patent No.: US 8,405,610 B1
(45) Date of Patent: Mar. 26, 2013

(54) ELECTROOCULOGRAPHICAL CONTROL FOR A MOBILE DEVICE

(75) Inventor: Joshua Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1183 days.

(21) Appl. No.: 12/257,716

(22) Filed: Oct. 24, 2008

(51) Int. Cl.
*G06F 3/033* (2006.01)
*G09G 5/08* (2006.01)

(52) U.S. Cl. ............................. 345/158; 345/7; 351/209

(58) Field of Classification Search .................. 345/7–9, 345/158, 156; 351/209, 210
See application file for complete search history.

(56) References Cited

U.S. PATENT DOCUMENTS

| | | | | |
|---|---|---|---|---|
| 5,555,895 | A * | 9/1996 | Ulmer et al. | 600/558 |
| 5,668,622 | A * | 9/1997 | Charbonnier et al. | 351/209 |
| 2006/0061544 | A1 * | 3/2006 | Min et al. | 345/156 |
| 2007/0273611 | A1 * | 11/2007 | Torch | 345/8 |

OTHER PUBLICATIONS

M J Savino et al. Visual communication interface for severe physically disabled patients Journal of Physics: Conference. Series. 90 012093 2007 pp. 1-5.

Sophie Hardach Blink and you'll miss it: Japan's new eye iPod Reuters http://www.reuters.com/article/technologyNews/idUS-SAT43550720080304 2008.

MOBILedit! http://www.mobiledit.com/me_overview.asp 2008 3 Pages.

Brown et al. ISCEV Standard for Clinical Electro-oculography (EOG) Springer Science and Business Media 2006 8 Pages.

* cited by examiner

*Primary Examiner* — Kimnhung Nguyen

(57) ABSTRACT

A device and computer-readable media are provided for controlling a mobile device by eye movement. Namely, embodiments of the present invention rely on electrooculographical and blink-sensing techniques to detect eye movement, where the eye movement can indicate that a user wishes to perform an action on a mobile device. The mobile device may be a cell phone, a portable digital assistant, or some other communications device. This invention is primarily directed for use by people who have physical impairments preventing them from operating mobile devices in a traditional way.

20 Claims, 13 Drawing Sheets

ELECTROOCULOGRAPHICAL CONTROL FOR A MOBILE DEVICE

SUMMARY

Embodiments of the invention are defined by the claims below, not this summary. A high-level overview of embodiments of the invention are provided here for that reason, to provide an overview of the disclosure.

In a first aspect, an electrooculographical control device for operating a mobile device using eye movement is provided. The device comprises a plurality of electrooculographical sensors that, when positioned around an eye, detect eye movement, wherein said eye movement indicates a desired action to be performed on said mobile device; a first processor, coupled to said sensors, that encodes said eye movement into a set of signals; a transmitter that is operable to communicate said set of signals; and a receiver that receives said set of signals and that converts them into commands for controlling said mobile device.

In a second aspect, computer-readable media for performing a method of controlling a mobile device by eye movement are provided, the method comprising: detecting said eye movement, wherein said eye movement indicates a desired action to be performed by said mobile device; converting said eye movement into a set of signals; communicating said set of signals to a receiver; receiving said set of signals and converting them into a set of mobile-device commands; and communicating said set of mobile device commands to said mobile device.

In a third aspect, computer-readable media having computer-useable instructions embodied thereon for performing a method of controlling a mobile device by eye movement is provided, the method comprising: presenting a display that indicates a current state of said mobile device; receiving a set of signals from a plurality of electrooculographical sensors, wherein said set of signals represents a user's eye movement, which indicates a desired action to be performed by said mobile device; generating input commands, which implement said action based on said set of signals; communicating said input commands to said mobile device; receiving an acknowledgement from said mobile device indicating that said desired action was performed; and updating said display that indicates that said mobile device performed said action.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
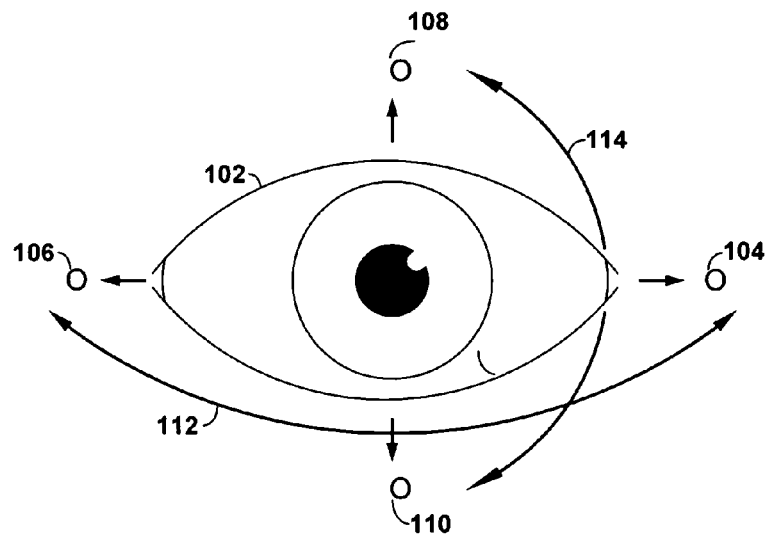
FIG. 1 depicts an eye with a plurality of electrooculographical sensors positioned on the skin around it as to measure its corneo-fundal potential.

Embodiments of the present invention provide a device and computer-readable media for controlling a mobile device using eye movement. Namely, this invention relies on electrooculographical ("EOG") and blink-sensing techniques to detect eye movement, where the eye movement can indicate that a user wishes to perform an action on a mobile device. This invention is primarily directed for use by people who have physical impairments preventing them from operating mobile devices in a traditional way.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of the present invention may be embodied as, among other things: a method, device, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

EOG is a technique for measuring eye movement that utilizes the natural electric potential between the front and back of the eye. This potential is often referred to as the corneo-fundal potential. The corneo-fundal potential is caused by the front of the eye being electrically positive compared to the back. Therefore when two electrodes are placed on the skin on either side of the eye, the potential difference measured between the two electrodes will change as the eye moves. The movement of the pupil can be derived from this potential difference, thus enabling one skilled in the art to track the eye movement.

FIG. 1 illustrates the general principle of EOG technology. Eye 102 is shown with two pairs of electrodes 104 and 106, and 108 and 110 placed on the skin around it. In the horizontal pair, electrode 104 is placed in an interior position and electrode 106 is placed in an exterior position relative to the eye. This pair of electrodes measures the horizontal movement of the eye as shown by arrow 112. In the vertical pair, electrode 108 is placed in a superior position and electrode 110 is placed in an inferior position relative to the eye. This pair of electrodes measures the vertical movement of the eye as shown by arrow 114. While two pairs of electrodes are shown, more or less pairs may be used depending on the desired level of precision. Note that each electrode should be placed in a position approximately 180 degrees from its partner in order to achieve maximal accuracy. Hereinafter, an EOG sensor will refer to a single pair of electrodes.

Figure 2:
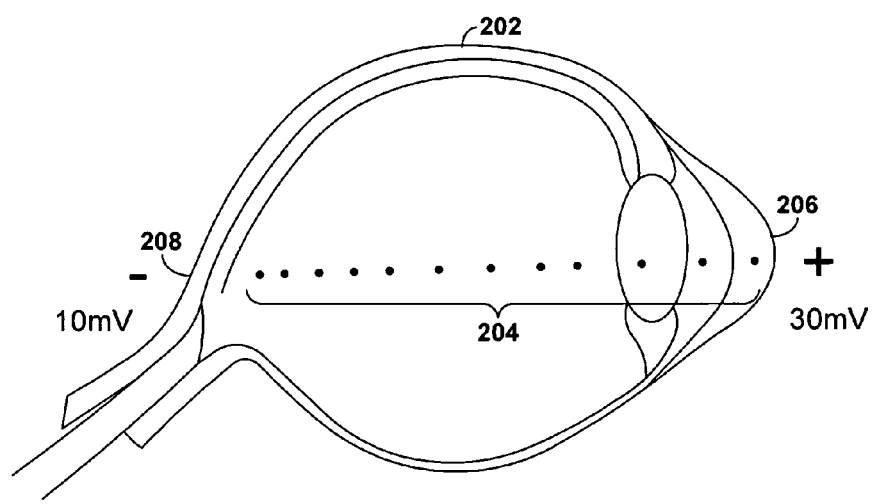
FIG. 2 depicts a cross section of an eye showing the corneo-fundal potential.

FIG. 2 depicts a cross section of eye 202 showing the corneo-fundal potential 204 between the front 206 and back 208 of the eye. The front of the eye (the pupil) 204 is shown having an electric charge of 30 mV while the back of the eye 208 has a charge of 10 mV. These values are given for illustrative purposes only.

Figure 3A:
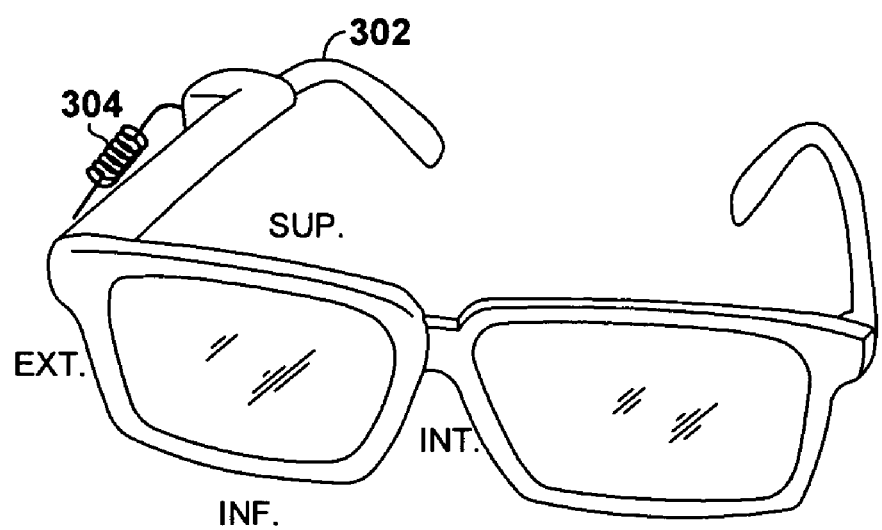
FIG. 3A depicts an embodiment of a component of an embodiment of the present invention.
Figure 3B:
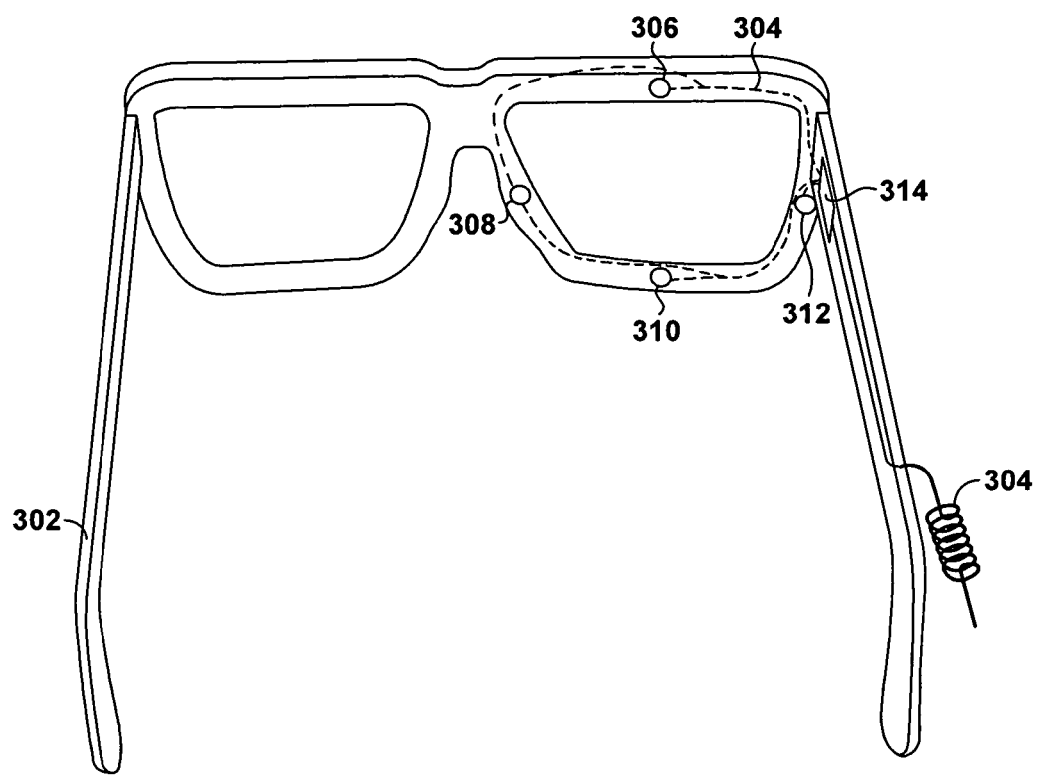
FIG. 3B depicts another embodiment of a component of an embodiment of the present invention.

In order to utilize EOG techniques to detect eye movement, the present invention must incorporate EOG sensors to track eye movement accurately. In one embodiment, eyewear is used to incorporate the EOG sensors. FIG. 3A depicts a front view of eyewear 302 used for an embodiment of the present invention, and FIG. 3B depicts a back view of eyewear 302. The eyewear is depicted containing a wire 304 connecting superior electrode 306, interior electrode 308, inferior electrode 310, exterior electrode 312, and a blink sensor 314. The electrodes are placed so that when the eyewear is worn by a user, the electrodes will come into contact with the user's skin. In an alternate embodiment, electrodes are placed around both eyes. Note that the blink sensor 314 may be mechanical, optical, or any other type of blink sensor known in the art.

Figure 3C:
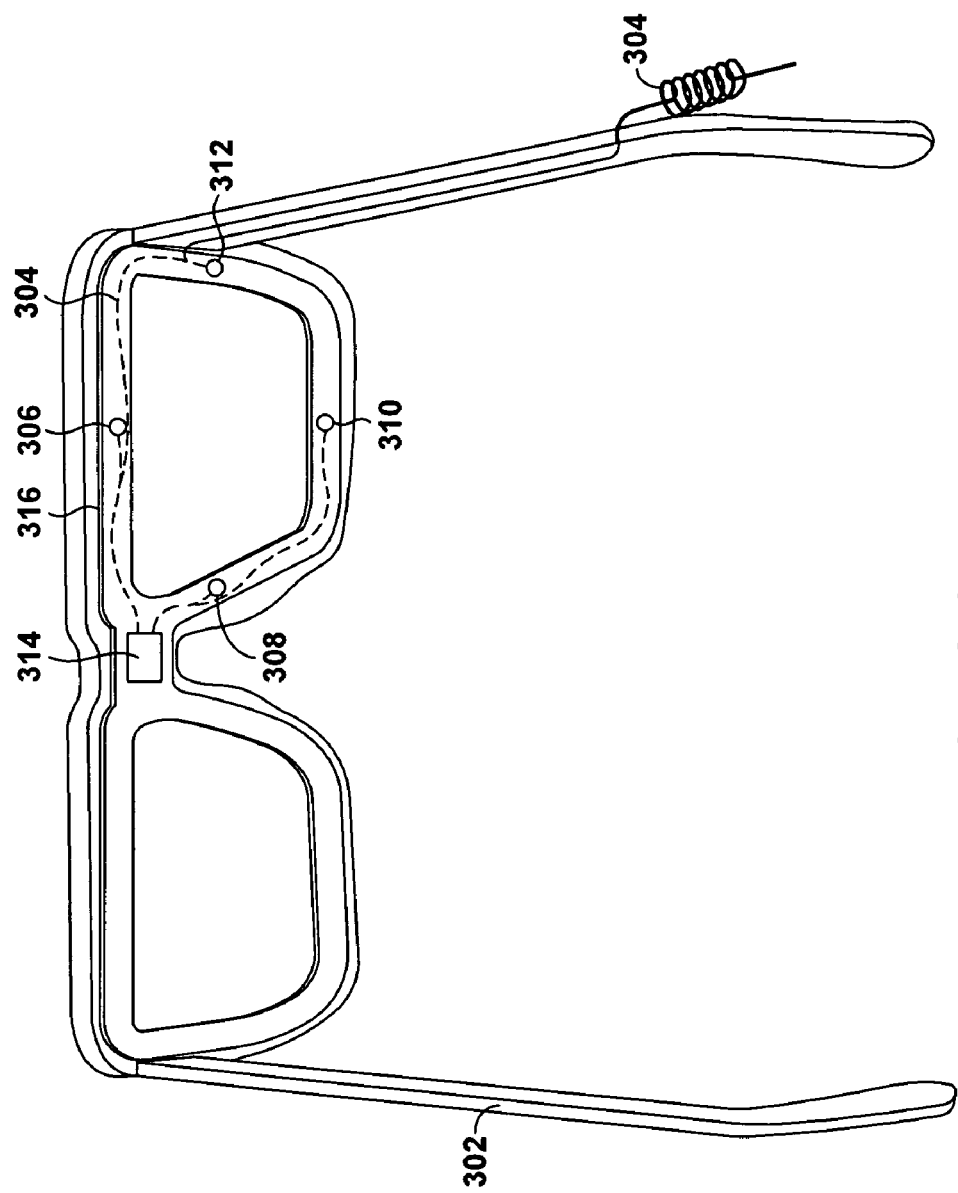
FIG. 3C depicts yet another embodiment of a component of an embodiment of the present invention.

FIG. 3C depicts an alternate embodiment of eyewear 302 where wire 304; electrodes 306, 308, 310, and 312; and blink sensor 314 are contained in clip-on frame 316. In this embodiment, any eyewear may be used, which eliminates the need for the user to purchase separate eyewear. This embodiment may be particularly useful to users who already require eyewear for vision correction. As with the previous embodiment, this embodiment need not have electrodes around both eyes.

Figure 4A:
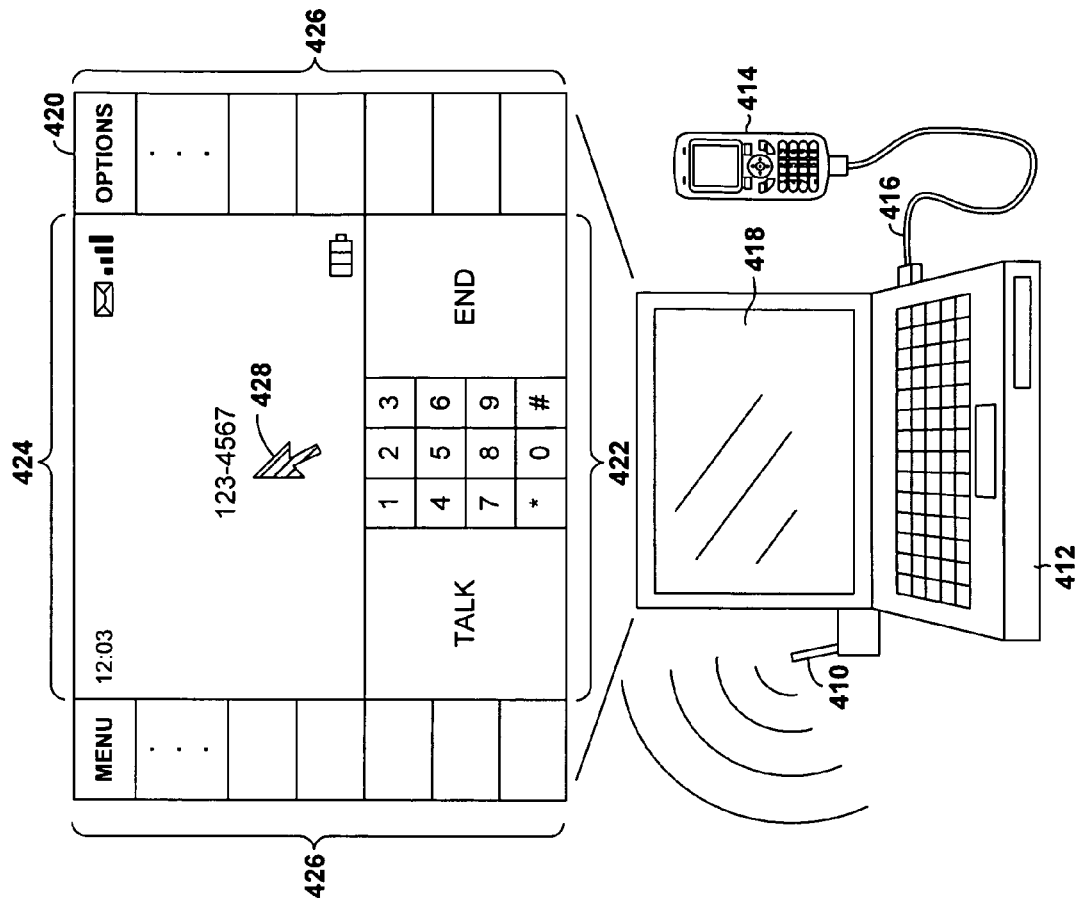
FIG. 4A depicts an embodiment of the present invention where a mobile device is controlled by eye movement.

FIG. 4A depicts an embodiment of the present invention. Eyewear 402, which is assumed to be similar to the eyewear 302 as depicted in FIGS. 3A-C, is connected by a wire 404 to an EOG processor 406. The EOG processor receives corneo-fundal voltage readings and blink indications from the EOG sensors and blink sensor contained in eyewear 402 and encodes the voltages and blink indications into a set of signals. The EOG processor contains a transmitter 408 that communicates the encoded signals. Transmitter 408 may be capable of near-field or far-field communications, and it may be one of a variety of different types of wireless transmitters as known in the art. For instance, transmitter 408 may be a Bluetooth™ transmitter. Receiver 410 is connected to a host computer 412 and is operable to receive the set of signals communicated by transmitter 408. Receiver 410 may be a variety of different types of wireless receivers. In one embodiment receiver 410 is a Bluetooth™ receiver.

Host computer 412 converts the set of signals into commands for controlling mobile device 414. The host computer and the mobile device are connected by a USB cable 416. Note that while a USB cable is shown, the host computer and mobile device may be connected in a variety of ways including wirelessly via Bluetooth™.

Mobile device 414 could be a cell phone, a PDA, or some other communications device. In general, mobile device 414 includes a user interface, a wireless communications interface, a processor, and a data storage component in one embodiment. The user interface may include buttons, a touch screen, a microprocessor, or other elements. The wireless communication interface may comprise an antenna and a chipset for communicating with a wireless telecommunications network. The processor and data storage component may be any suitable component known to those of skill in the art. Mobile device 414 also includes a computer-readable media with computer-readable instructions embodied thereon that perform methods that include interacting with host computer 412. The computer-readable media may provide a number of functions for interacting with the host computer including functions for receiving input commands from the host computer, alerting the host computer when the state of the mobile device changes, sending a list of available mobile device commands to the host computer, etc.

The state of the mobile device includes any processes that are being executed by the mobile device at a current point in time. These processes could result in updating the display of the mobile device, limiting the number of mobile device commands available to the user, or altering data that is stored on the mobile device. The computer-readable instructions may vary depending on the type of mobile device they are embodied on and its capabilities. The computer-readable media is further explained in the discussion relating to FIG. 4B.

Host computer 412 contains computer-readable media with computer-readable instructions embodied thereon that perform methods for interacting with mobile device 414 and presenting on its display 418 an EOG control application window 420, which presents the current state of the mobile device. The computer-readable instructions may vary depending on the type of host computer and mobile device used and may be installed on any type of computer to which the user has access. The computer-readable media residing on the host computer is further explained in the discussion relating to FIG. 4B.

In one embodiment, the EOG control application window 420 presents a graphical depiction of mobile device 414 including physical components such as the keypad 422, a depiction of the information depicted on the mobile device's display 424, as well as any other buttons that allow for interactions with the mobile device or configurations of the EOG control application 426. Pointer 428 provides the same functionality as an ordinary computer mouse pointer except that its movement corresponds to the user's eye movement and is used as a reference point to indicate where the user is looking in the EOG control application window. For instance if the user's eye moves to the left, then the pointer will move to the left of the EOG control application window. The pointer also includes click functionality similar to that of a computer mouse. The click functionality may be implemented in a variety of ways. In an exemplary embodiment, a user blink corresponds to a pointer click.

Figure 4A:
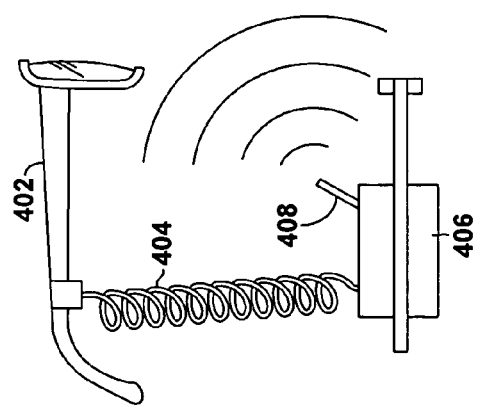
Figure 4B:
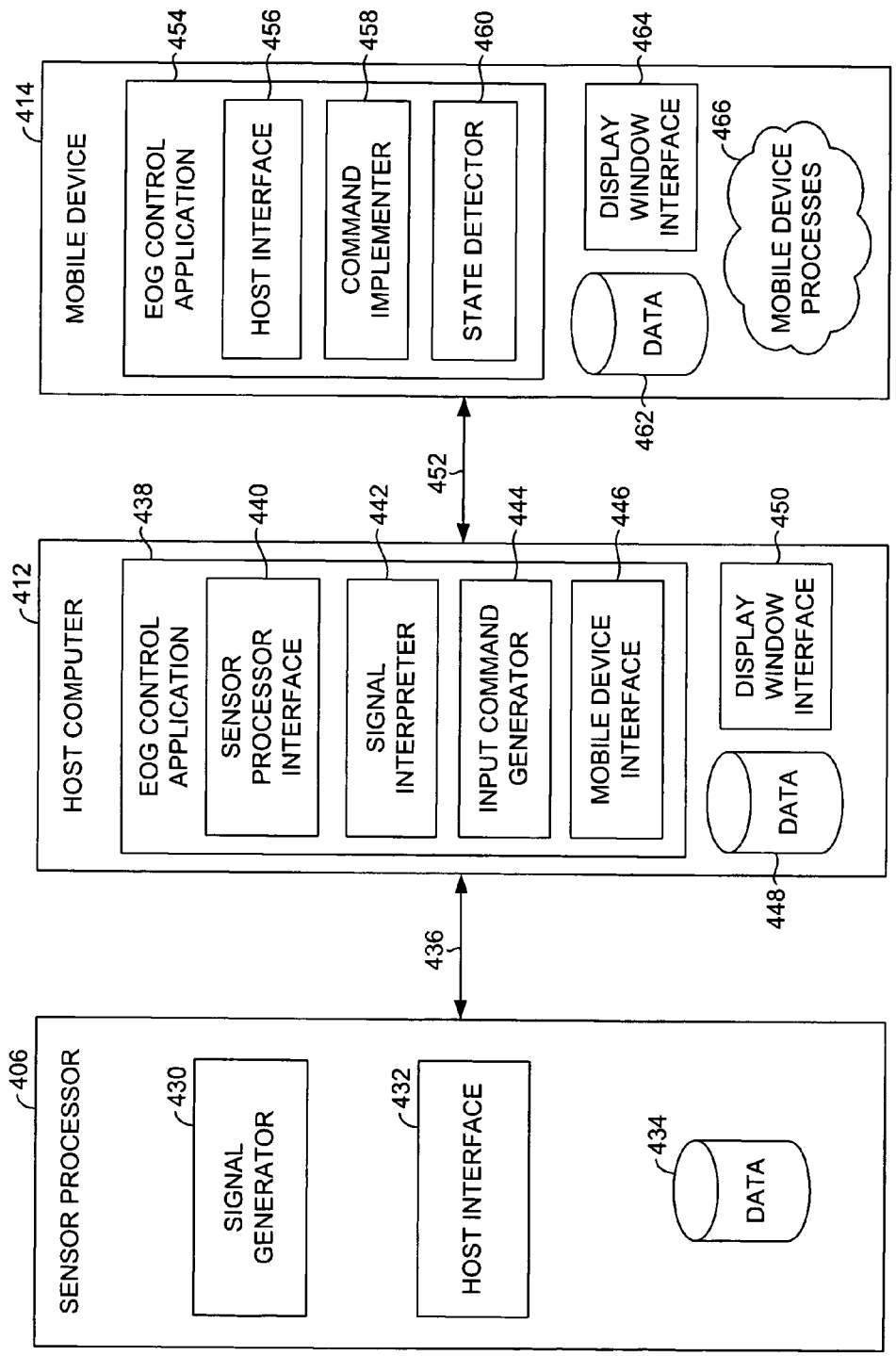
FIG. 4B depicts a more detailed diagram of specific components of the embodiment of the present invention depicted in FIG. 4A.

FIG. 4B depicts a more detailed view of components present within this embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Referring to FIG. 4B, the sensor processor 406 contains a signal generator 430 that takes the voltage readings and blink indications given by the EOG and blink sensor array and encodes them into a set of signals. The set of signals is sent to a host interface 432. In one embodiment, this set of signals is also stored in a data component 434, which may be any suitable data storage component as known in the art. The host interface interacts 436 with the host computer 412. This interaction may include the sending and receiving of data. In addition to sending the generated set of signals, the host interface may also send error messages, status updates, or other relevant types of information to the host computer. The host interface may also receive acknowledgments of executed actions and other information from the host computer.

Host computer 412 contains an EOG control application 438 which in turn contains a sensor processor interface 440, a signal interpreter 442, an input command generator 444, and a mobile device interface 446. The sensor processor interface 440 interacts 436 with the host interface 432 of the sensor processor 406. Additionally, the sensor processor interface receives signals generated by the sensor processor, error messages, and may send acknowledgments of executed activities. The host computer may also store received sets of signals in a data storage component 448, which may be any suitable data storage component as known in the art. The signal interpreter 442 takes the received signals and interprets them as either eye movement or blink indications. Eye movement activity will correspond to moving the pointer 428 in a manner consistent with the eye movement signals in the EOG control application window 420. The signal interpreter sends updated pointer locations to the EOG control application window 420.

Blink indications correspond to the user clicking on a particular component present in the EOG control application window. Referring back to FIG. 4A for instance, if the pointer 428 is hovering over a button of menu bar 426, then the user may blink to simulate a click of the button. When the click selects an option corresponding to an operation to be performed on mobile device 414, the signal interpreter sends the appropriate information to the input command generator 444. Click activity could also correspond to the user desiring a change in settings for the EOG control application, in which case the signal interpreter implements these changes accordingly, sending updates to the display window interface 450 if necessary. The display window interface is the part of the host computer that controls the host computer display.

The input command generator 444 receives information from the signal interpreter when a particular action is to be performed on the mobile device. The input command generator generates the appropriate input command for the mobile device. This may be accomplished by referencing a set of input commands available for the mobile device stored in data storage component 448, for instance. Once the input commands are generated, they are sent to the mobile device interface 446, which communicates 452 them to the mobile device 414. The generated input commands may also be stored on data storage component 448.

Mobile device 414 contains its own EOG control application 454, which has a host interface 456, a command implementer 458, and a state detector 460. The host interface 456 handles all communications between the host computer and the mobile device including receiving input commands and sending information indicative of the mobile device's state.

The command implementer 458 receives input commands from the host interface and implements the command. Depending on the input command, this might include accessing or updating data stored on a data storage component 462, updating the mobile device display 464, or initiating or ending the mobile device processes 466. Examples of mobile device processes include incoming or ongoing calls, accessing voicemail, or any other process that a mobile device might engage in. The state detector 460 monitors the state of the mobile device and generates state update information to be sent to the host computer whenever the state changes. The state update information could include changes in running processes, changes in the commands available to the user, changes in the mobile device display, and any other change in state that the mobile device might experience. This state update information is sent to the host interface, which communicates it to the host computer in interaction 452.

Those skilled in the art will appreciate that the present invention is operational with a variety of additional general purpose or special purpose computing systems, environments, and/or configurations. Examples of well-known computing systems, environments, and/or configurations that may be suitable for use with the present invention include, but are not limited to, personal computers, server computers, handheld or laptop devices, multiprocessor systems, microprocessor-based systems, programmable consumer electronics, network PCs, minicomputers, mainframe computers, and the like. The invention also may be practiced in distributed computing environments wherein tasks are performed by remote processing devices that are linked through a communications network. In a distributed computing environment, program modules may be located in both local and remote computer storage media including memory storage devices.

Figure 5A:
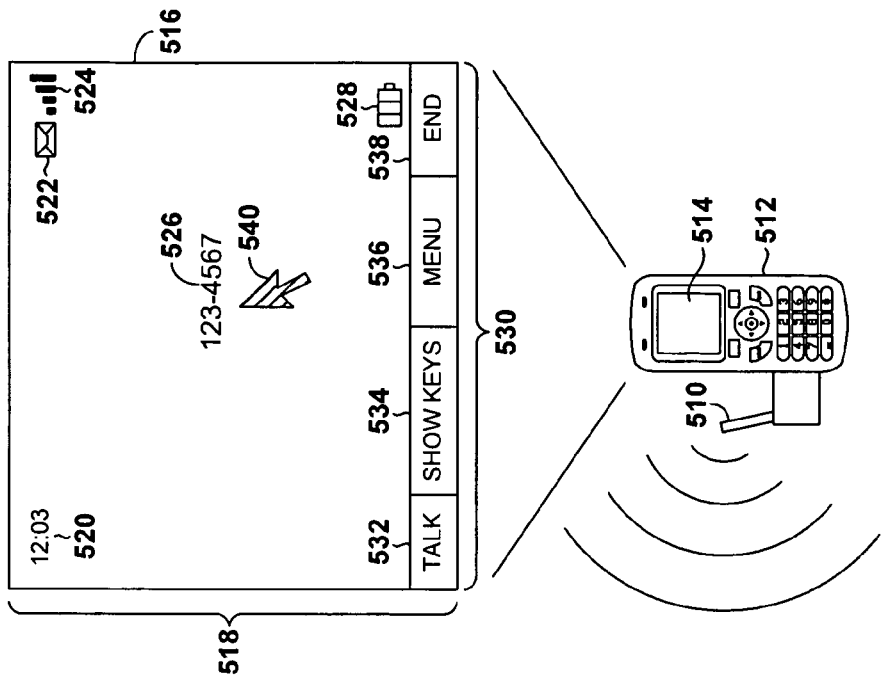
FIG. 5A depicts another embodiment of the present invention where a mobile device is controlled by eye movement.

FIG. 5A is an alternate embodiment of the present invention where components 502-508 are identical to components 402-408 in FIG. 4. Receiver 510 is connected to mobile device 512. Receiver 510 may be any type of wireless receiver including a Bluetooth™ receiver. Mobile device 512 is similar to mobile device 414 in FIG. 4, except that the computer-readable media in mobile device 512 contains computer-readable instructions for methods of enabling a user to control the mobile device using eye movement. Therefore, this embodiment of the present invention operates without a host computer. The computer-readable media is further discussed in FIG. 5B.

Mobile device display 514 presents an application window 516, which is similar in function to application window 420. Application window 516 contains the typical mobile device display 518, which displays the information typically displayed by the mobile device. In this embodiment, the mobile device is in a state where the time 520, battery level 528, voicemail indication 522, signal strength 524, and a phone number entered by the user 526 are shown. Menu bar 530 allows the user to interact with the mobile device via pointer 540, which is identical in its functionality and operation to pointer 428 in FIG. 4. The options available in menu bar 530 will vary depending on the functionality of mobile device 512. In this embodiment, the menu bar displays a talk button 532, which allows a user to start a process such as a phone call; a show keys button 534, which when selected by pointer 540, displays a keypad that allows the user to input data via the pointer (keypad not shown); a menu button 536, which allows the user to see the mobile device's menu functions; and an end button 538, which allows a user to end a process such as a phone call. The aforementioned menu bar options will vary depending on the type of mobile device 512 and are given here for illustrative purposes only.

Figure 5A:
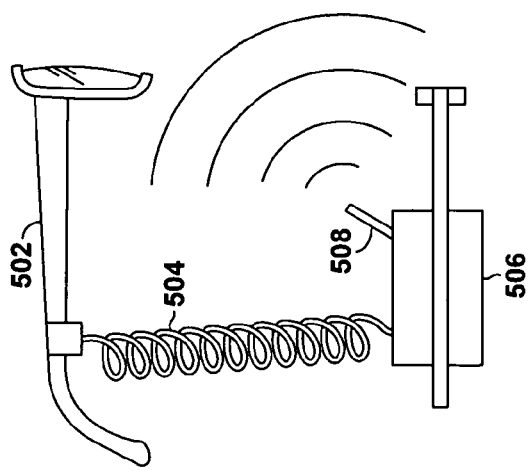
Figure 5B:
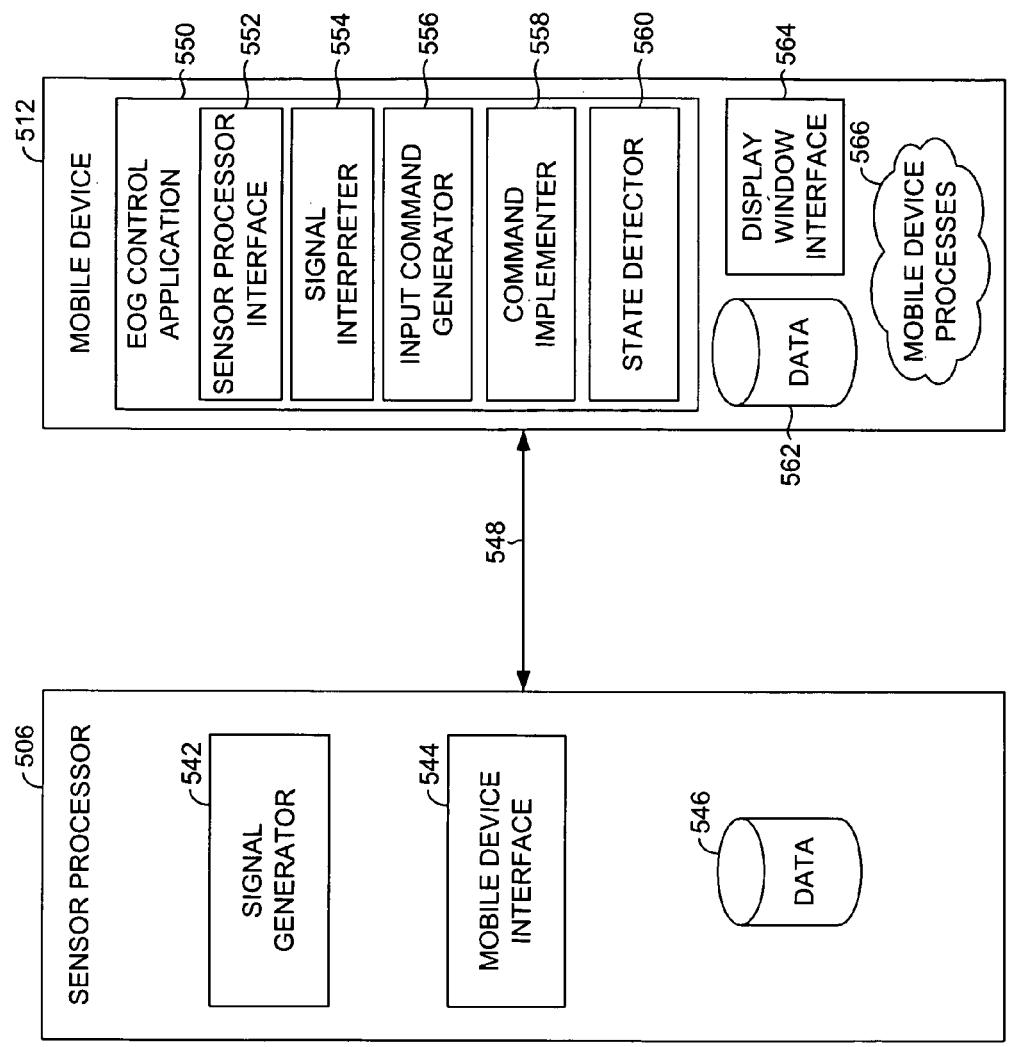
FIG. 5B depicts a more detailed diagram of specific components of the embodiment of the present invention depicted in FIG. 5A.

FIG. 5B depicts a more detailed view of components present within the specific components of this embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Referring to FIG. 5B, sensor processor 506 contains a signal generator 542, mobile device interface 544, and data storage component 546. The signal generator and data storage component are identical to signal generator 430 and data component 434 in FIG. 4B. Mobile device interface 544 interacts with mobile device 512. This interaction 548 may include the sending and receiving of data. In addition to sending the generated set of signals, the mobile device interface may also send error messages, status updates, or other relevant types of information. The mobile device interface may also receive acknowledgments of executed actions and other information from the mobile device.

Mobile device 512 contains an EOG control application 550, which includes a sensor processor interface 552, a signal interpreter 554, an input command generator 556, a command implementer 558, and a state detector 560. The sensor processor interface handles all communications between the mobile device and the sensor processor. These communications may include receiving signals from the signal processor and sending acknowledgements of completed actions. The sensor processor interface may also store received signals in a data storage component 562, which may be any suitable data storage component as known in the art.

The signal interpreter 554 takes the received signals and interprets them as either eye movement or blink indications. Eye movement activity, which was initially measured by the EOG sensors, results in moving the pointer 540 to the area where the user is looking on the mobile device display 514. The signal interpreter sends updated pointer locations to the display window interface 564. Blink indications, which initially are detected by the blink sensor, correspond to the user clicking on a particular component present in the mobile device display 514. If a click corresponds to an operation to be performed on mobile device 512, then the signal interpreter sends the appropriate information to the input command generator 556. Click activity could also correspond to the user desiring a change in settings for the EOG application, in which case the signal interpreter implements these changes accordingly, updating the display if necessary.

The input command generator 556 receives information from the signal interpreter when the information indicates that a user desires a particular action to be performed on the mobile device. The input command generator generates the appropriate input command for the mobile device. This may be accomplished by referencing a set of input commands available for the mobile device stored in data storage component 562. The generated input commands may also be stored in data storage component 562.

The command implementer 558 receives input commands from the input command generator and implements the command. Depending on the input command, this might include accessing or updating a data storage component 562, sending display updates to the display window interface 564, or updating the current running processes 566. Examples of a current running process include incoming or ongoing calls, accessing voicemail, or any other process that a mobile device might engage in. The state detector 560 monitors the state of the mobile device and generates updates for the EOG control application 550 including updates for the menu bar 530. State update information may also be sent to the sensor processor interface, which communicates it to the sensor processor.

Figure 6:
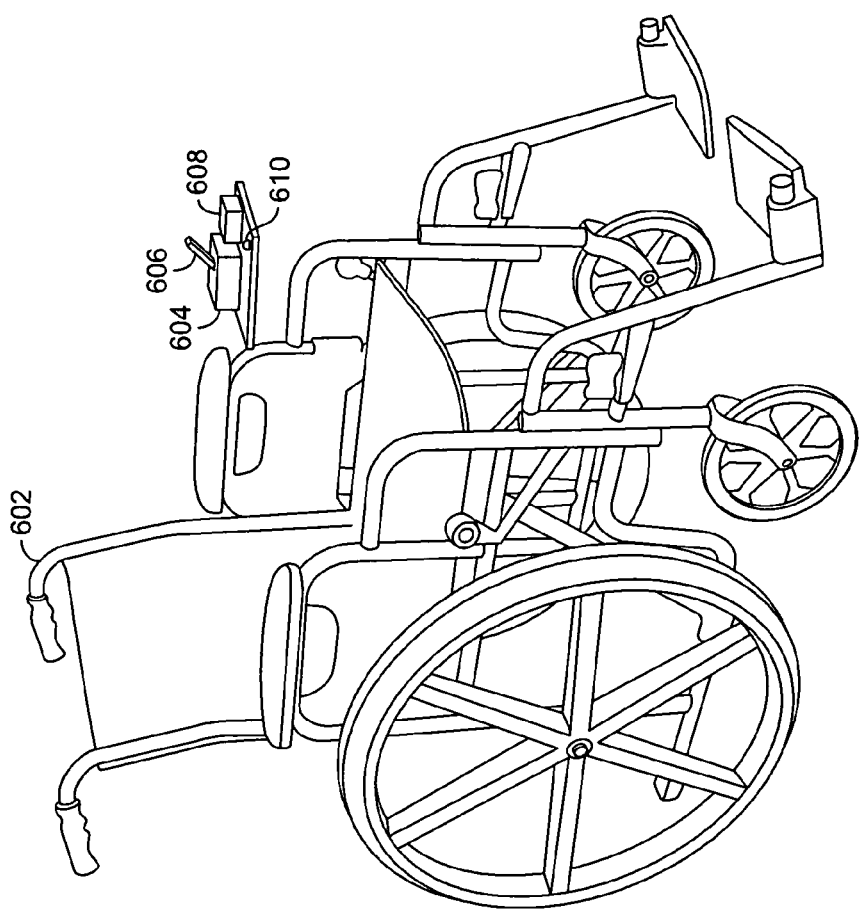
FIG. 6 depicts an embodiment of the present invention where certain components of the present invention are mounted onto a wheelchair.

FIG. 6 depicts an embodiment of the present invention, where the sensor processor and other components are mounted onto a wheelchair. Wheelchair 602 may be any type of wheelchair used by a user of the present invention. Sensor processor 604 is mounted onto wheelchair 602 in addition to transmitter 606, power source 608, and light source 610. The sensor processor and transmitter were discussed in previous figures. Power source 608 may be any source of power for the EOG components including battery power. Light source 610 may be an LED light or similar light that indicates when the EOG components mounted to the wheelchair are powered on. In an alternate embodiment, components 604-610 are contained in a belt pack.

Figure 7:
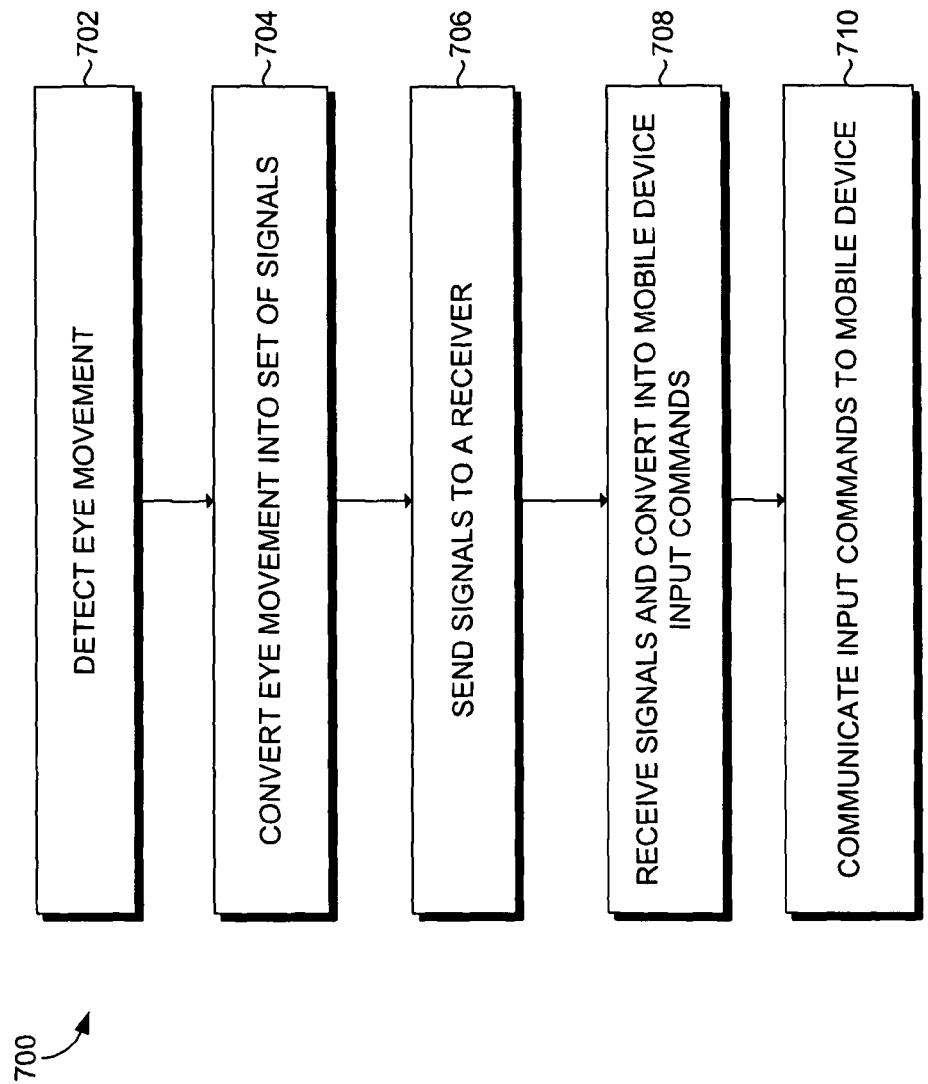
FIG. 7 depicts a flow diagram for a method of controlling a mobile device using eye movement.

FIG. 7 depicts a flow diagram for a method used by the computer-readable media of the present invention. Method 700 begins with step 702 when eye movement is detected. In step 704, the eye movement, which may be in the form of voltage readings and blink indications, is encoded into a set of signals by the EOG processor. These signals are transmitted by the EOG processor to a receiver in step 706. Once the signals are received, they are converted into mobile device input commands (708), which are then communicated to the mobile device in step 710.

Figure 8A:
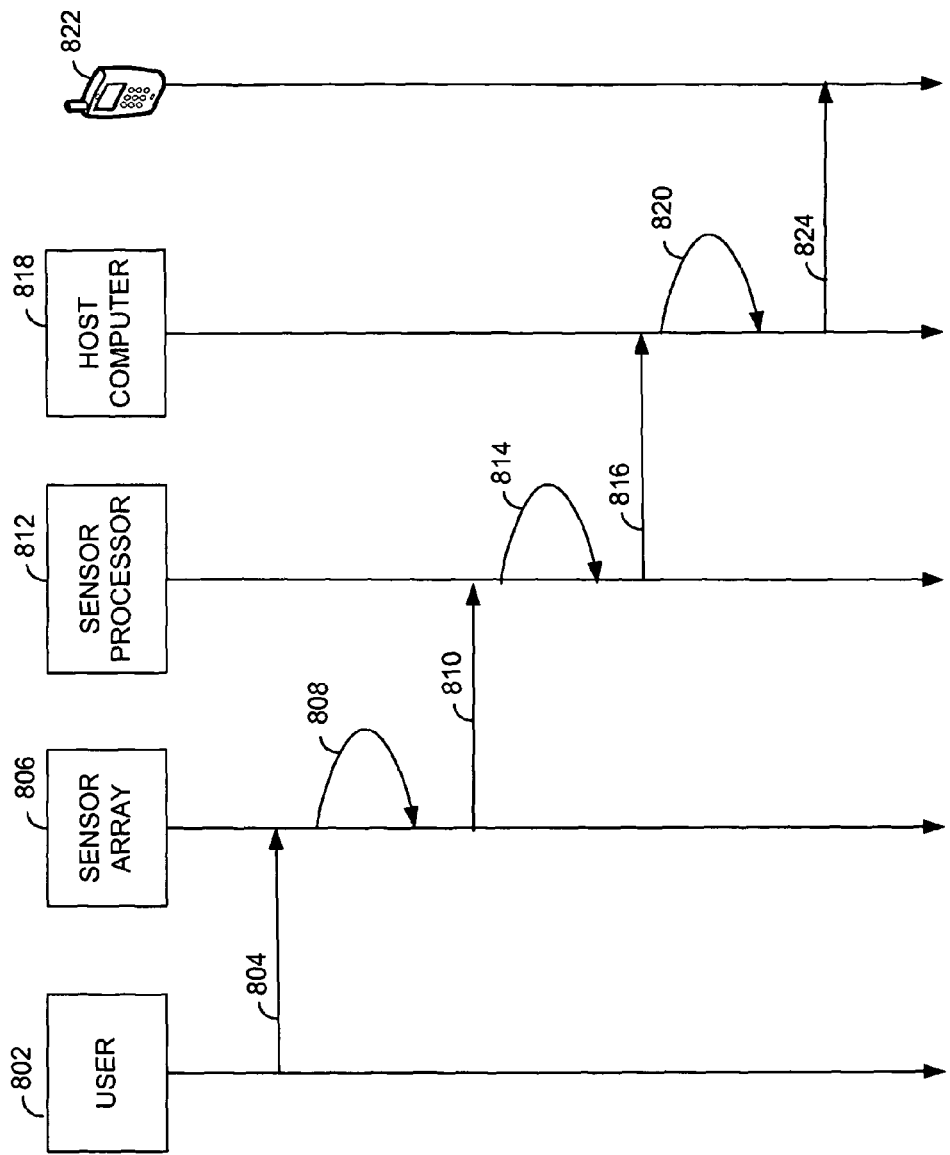
FIG. 8A depicts a diagram for a method of controlling a mobile device using eye movement used by the computer-readable media of the present invention.

FIG. 8A depicts a diagram for a method used by the computer-readable media of the present invention. The method begins when a user 802 moves their eyes (804). The array of EOG and blink sensors detects this movement 808 and sends (810) the corresponding voltage readings and/or blink indications to the sensor processor 812. The sensor processor then encodes the voltage readings and/or blink indications into a set of signals 814, and communicates (816) them to a host computer 818. The host computer receives the set of signals and converts them into the appropriate input commands (820) for mobile device 822 as discussed previously. Once the input commands have been generated, the host computer communicates them to the mobile device 824.

Figure 8B:
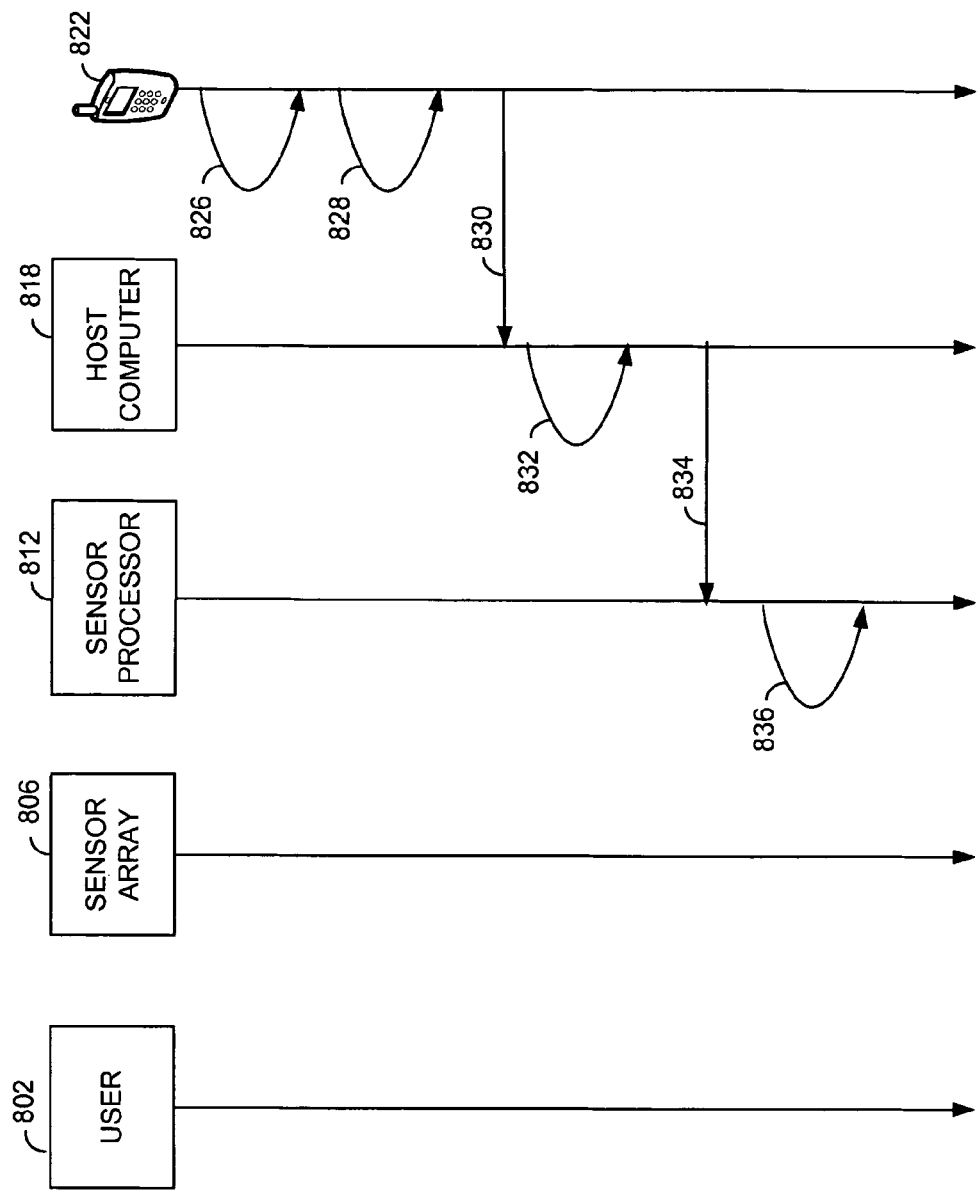
FIG. 8B depicts yet another diagram for a method of controlling a mobile device using eye movement used by the computer-readable media of the present invention.

FIG. 8B is a continuation of FIG. 8A and begins at step 826. In step 826, mobile device 822 receives the input commands from the host computer and executes them accordingly. Once the commands have been executed, an acknowledgement is generated 828 intended to give host computer 818 updated information regarding the state of mobile device 822. This information may include what operations the mobile device has performed or is performing, what the mobile device is displaying, what options are available to the user in the current state, and similar information. This information is then communicated 830 to the host computer 818. The EOG control application running on the host computer then uses this information to update its display window as discussed with regard to FIGS. 4A-B 832. Once the state updates are complete, an acknowledgement may be sent to the sensor processor indicating the executed activity 834. The sensor processor then idles until the next input from the sensor array 836. In an alternate embodiment similar to that depicted in FIG. 5, the host computer 818 is omitted, and all applicable operations performed by it are preformed by mobile device 822.

Figure 9:
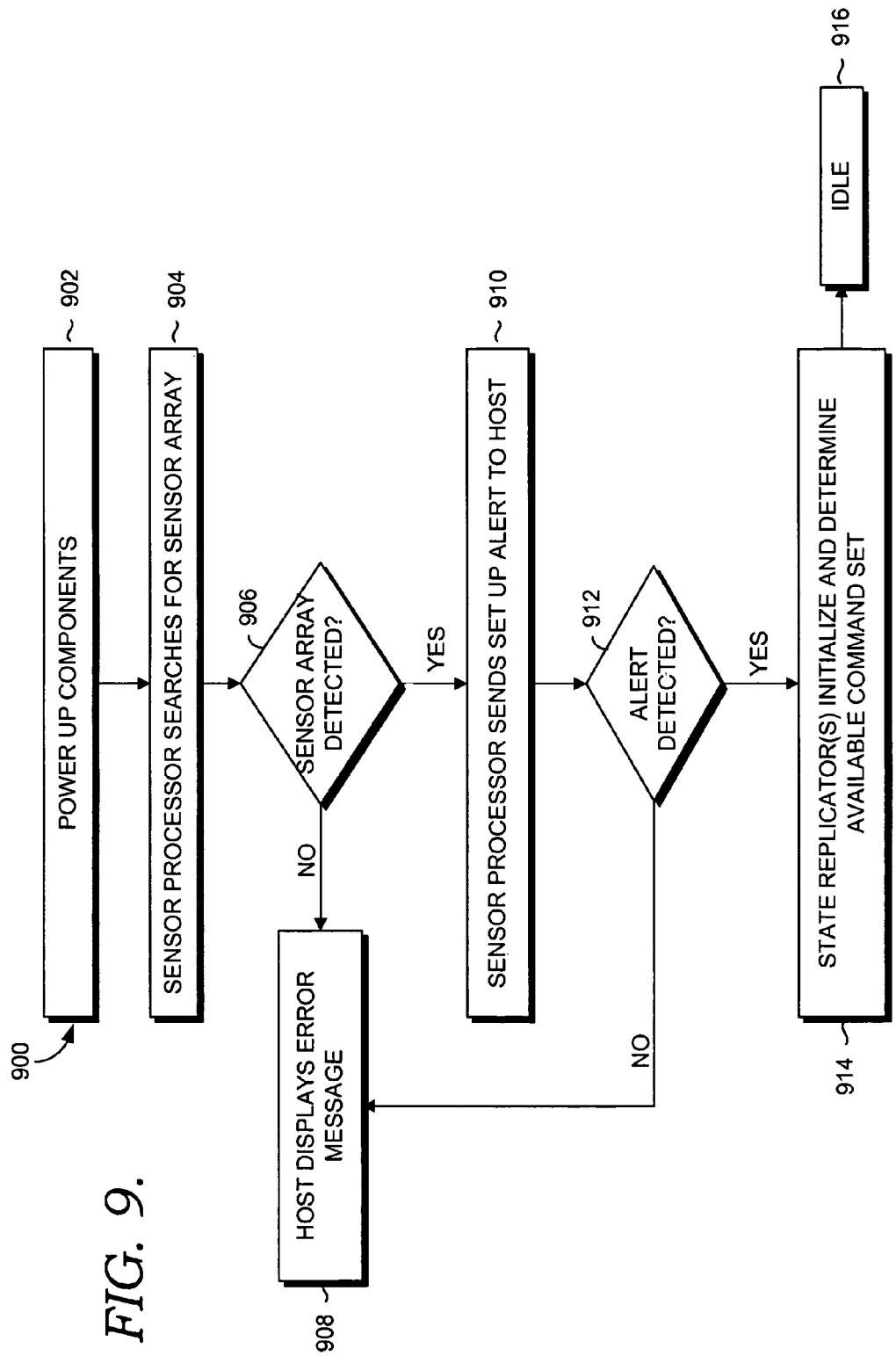
FIG. 9 depicts a flow diagram for a method of initializing the device of the present invention.

FIG. 9 depicts a flow diagram for a method of initializing the device of the present invention. The method 900 begins when the components are powered up in step 902. This step may also include starting up the EOG control applications resident on the mobile device and/or host computer if applicable. Once powered up, the sensor processor begins searching for the sensor array in step 904. If the sensor array is not detected 906, the sensor processor sends an error message to either the host computer or mobile device where that message is displayed for the user 908. If the sensor array is detected, then the sensor processor sends an alert to set up the host 910. If the host detects the alert 912, then the EOG control applications may perform initialization procedures in step 914. In the embodiment where there is a host computer, these initialization procedures may include establishing communications between the mobile device and the host, and the host receiving an update of the state of the mobile device so that the EOG control application on the host computer may reflect this state in its display. After the host and the control applications have finished their initialization procedures, all components will idle until a user input is detected 916. Returning to decision step 912, if the host does not detect the setup alert sent by the sensor processor, then the host will display an error message 908.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An electrooculographical control device for operating a mobile device, the device comprising:
one or more pairs of electrooculographical sensors that, when positioned around an eye, detect eye movement, wherein said eye movement indicates a desired action to be performed on said mobile device;
a first processor, coupled to said sensors, that encodes said eye movement into a set of signals;
a transmitter that is operable to communicate said set of signals; and
a receiver that receives said set of signals and that converts them into commands for controlling said mobile device.

2. The device of claim 1 further comprising:
at least one blink sensor that, when positioned in close proximity to said eye, detects eye blinks, wherein said eye blinks indicate a desired action to be performed on said mobile device.

3. The device of claim 1, wherein a first pair of electrooculographical sensors includes a first electrooculographical sensor that is placed in an interior position relative to said eye and a second electrooculographical sensor that is placed in an exterior position relative to said eye, and wherein a second pair of electrooculographical sensors includes a third electrooculographical sensor that is placed in a superior position relative to said eye and a fourth electrooculographical sensor that is placed in an inferior position relative to said eye.

4. The device of claim 1, wherein said one or more pairs of electrooculographical sensors are affixed to an eyewear frame.

5. The device of claim 1, wherein said one or more pairs of electrooculographical sensors are affixed to a removable frame that may be clipped on to an eyewear frame.

6. The device of claim 1, wherein said transmitter is wireless.

7. The device of claim 1, wherein said receiver is coupled to said mobile device.

8. The device of claim 1, wherein said receiver is coupled to a host computer, which is coupled to said mobile device.

9. The device of claim 8, wherein said host computer presents a display that indicates a current state of said mobile device.

10. The device of claim 1, wherein said first processor is worn on a belt.

11. The device of claim 1, wherein said first processor is affixed to a wheelchair.

12. One or more non-transitory computer-readable media having computer-useable instructions embodied thereon for performing a method of controlling a mobile device by eye movement, the method comprising:
detecting said eye movement based on information from one or more pairs of electrooculographical sensors, wherein said eye movement indicates a desired action to be performed by said mobile device;
converting said eye movement into a set of signals;
communicating said set of signals to a receiver;
receiving said set of signals and converting them into a set of mobile-device commands; and
communicating said set of mobile device commands to said mobile device.

13. The media of claim 12, wherein the communication of said set of signals is wireless.

14. The media of claim 12, wherein the communication of said set of commands is wireless.

15. The media of claim 12 further comprising:
receiving an acknowledgement from said mobile device indicating that said desired action was performed.

16. One or more non-transitory computer-readable media having computer-useable instructions embodied thereon for performing a method of controlling a mobile device by eye movement, the method comprising:
presenting a display that indicates a current state of said mobile device;
receiving a set of signals from one or more pairs of electrooculographical sensors, wherein said set of signals represents a user's eye movement, which indicates a desired action to be performed by said mobile device;

generating input commands, which implement said action based on said set of signals;

communicating said input commands to said mobile device;

receiving an acknowledgement from said mobile device indicating that said desired action was performed; and updating said display that indicates that said mobile device performed said action.

17. The media of claim 16, wherein said set of signals also includes signals generated by at least one blink sensor.

18. The media of claim 16, wherein the communicating of said input commands is wireless.

19. The media of claim 16, further comprising:
generating an acknowledgement indicating that said mobile device performed said action; and
communicating said acknowledgement.

20. The media of claim 16, wherein said acknowledgement from said mobile device is reacting to said input commands normally to perform said desired action.

\* \* \* \* \*